(12) United States Patent
Mueller

(10) Patent No.: US 6,328,335 B1
(45) Date of Patent: Dec. 11, 2001

(54) AIRBAG DEVICE AND TRIGGERING METHOD THEREFOR

(75) Inventor: Olaf Mueller, Ruesselsheim (DE)

(73) Assignee: Inova GmbH Technische Entwicklungen, Ruesselheim (DE)

(*) Notice: Subject to any disclaimer, the term of this patent is extended or adjusted under 35 U.S.C. 154(b) by 0 days.

(21) Appl. No.: 09/444,563

(22) Filed: Nov. 19, 1999

(30) Foreign Application Priority Data

Nov. 19, 1998 (DE) .......................................... 298 20 722 U

(51) Int. Cl.7 .................................................... B60R 21/32
(52) U.S. Cl. ............................................. 280/735; 701/45
(58) Field of Search ................................. 280/735, 743.1, 280/743.2; 701/45

(56) References Cited

U.S. PATENT DOCUMENTS

| | | | |
|---|---|---|---|
| 4,007,685 | * | 2/1977 | Nimylowycz .......................... 102/530 |
| 4,620,721 | * | 11/1986 | Scholz et al. ........................ 280/735 |
| 4,851,705 | * | 7/1989 | Musser et al. ....................... 307/10.1 |
| 4,974,874 | * | 12/1990 | Muraoka .............................. 280/735 |
| 5,080,395 | * | 1/1992 | Morota et al. ....................... 280/735 |
| 5,157,268 | * | 10/1992 | Spies et al. ......................... 307/10.1 |
| 5,173,614 | * | 12/1992 | Woehrl et al. ....................... 307/10.1 |
| 5,389,822 | * | 2/1995 | Hora et al. .......................... 307/10.1 |
| 5,411,289 | * | 5/1995 | Smith et al. ......................... 280/735 |
| 5,668,528 | * | 9/1997 | Kitao et al. ......................... 340/436 |
| 5,725,242 | * | 3/1998 | Belau et al. ......................... 280/735 |
| 5,777,225 | * | 7/1998 | Sada et al. ............................. 73/488 |
| 5,779,264 | * | 7/1998 | Mersseman et al. ................. 280/735 |
| 5,796,177 | * | 8/1998 | Werbelow et al. .................. 307/10.1 |
| 5,820,161 | * | 10/1998 | Svensson ............................. 280/737 |
| 5,892,435 | * | 4/1999 | Buchheim et al. .................. 340/438 |
| 5,927,427 | * | 7/1999 | Sewell et al. ........................ 180/273 |
| 5,936,313 | * | 8/1999 | Cook, Jr. et al. ................... 307/10.1 |
| 5,995,891 | * | 11/1999 | Mayumi et al. ....................... 701/45 |
| 5,999,871 | * | 12/1999 | Liu ........................................ 701/45 |
| 6,007,095 | * | 12/1999 | Stanley ................................ 280/735 |
| 6,036,225 | * | 3/2000 | Foo et al. ............................. 280/735 |
| 6,186,540 | * | 2/2001 | Edgren ................................ 280/735 |
| 6,189,928 | * | 2/2001 | Sommer et al. .................. 280/743.2 |

OTHER PUBLICATIONS

PCT/WO 98/26960, Hans Edgren, Jun. 25, 1998.*

* cited by examiner

Primary Examiner—Paul N. Dickson
Assistant Examiner—Deanna L. Draper
(74) Attorney, Agent, or Firm—Martin Fleit; Paul D. Bianco

(57) ABSTRACT

The invention relates to an air bag system which has multi-stage gas generating devices, with a primary stage for the partial inflating of an air bag and at least one subsequent stage which can be electrically and/or electronically triggered only as a function of an unhindered expansion of the air bag because of the inflating by a preceding stage, at least one electric switch being provided which can be switched as a function of the undisturbed expansion of the air bag because of the inflating by the preceding stage and is connected for the electric and/or electronic triggering of the subsequent stage. The invention also relates to a triggering process for an air bag system having multi-stage gas generating devices, by a primary stage, an air bag being partially inflated and, only as a function of an undisturbed expansion of the air bag because of the inflating by a preceding stage, at least one subsequent stage being electrically and/or electronically triggered, as a function of the undisturbed expansion of the air bag because of the inflating by the preceding stage, at least one electric switch being operated, and, as the result, the subsequent stage being electrically and/or electronically triggered.

22 Claims, 3 Drawing Sheets

AIRBAG DEVICE AND TRIGGERING METHOD THEREFOR

BACKGROUND AND SUMMARY OF THE INVENTION

The invention relates to an air bag system which has multi-stage gas generating devices as well as a triggering process for such an air bag system.

Air bag systems of this type operate in several stages, in which case subsequent stages of the air bag system, which follow a primary stage, are ignited as a function of unhindered expansion possibilities of an air bag of the air bag system. For this purpose, strings, cords or similar mechanical devices are mounted at one end in the interior of the air bag on its material and are coupled at their other end with ignition devices of at least one subsequent stage. Only when a string, cord, etc., or all strings, cords or similar devices are acted upon by tension beyond their completely tensioned state, or, in other words, when the air bag can expand further beyond a defined position in an unhindered manner, will a triggering of a subsequent stage be caused, for example, by means of the string tension.

In general, the invention therefore relates to the ignition of a second or additional air bag stage as a function of the moving possibility of the surface of an air bag of an air bag system which surface advances because of the ignition of a primary stage or a generally preceding stage of the air bag system.

In particular, the invention relates to an air bag system, as it is revealed in principle in German Patent Applications 197 03 945.6, 197 09 257.8 and 197 15 463.8. Additional embodiments and characteristics of such air bag systems are disclosed in German Patent Applications 197 12 782.7, 197.26 878.1 and 197 33 896.8. All above-mentioned German patent applications are applications by the present applicant. For avoiding repetitions, the disclosure contents of all German patent applications are fully included in the present documents by this reference, specifically concerning characteristics for the multi-stage ignition or the triggering of air bag systems in the older applications.

In the above-mentioned German Patent Applications 197 03 945.6, 197 09 257.8 and 197 15 463.8, the second air bag stage is ignited in that cables on the interior side of the air bag front of the air bag system moving during the expanding of the air bag onto the occupant and unlocking, for example, a spring-prestressed striking pin and the latter strikeing onto an igniter.

The technology disclosed in the above-mentioned German patent applications relates particularly to mechanical triggerings and controls for the multi-stage ignition of air bag systems, but electrically or electronically ignitable subsequent stages are also mentioned. However, the disclosures of the above-mentioned older patent applications do not contain concrete implementations of the control of electrically or electronically ignitable subsequent stages of such air bag systems which can be ignited in several stages.

It is an object of the invention to provide a practical further development of an air bag systems which can be ignited in several stages and has at least one electrically or electronically ignitable subsequent stage, and a practical triggering process therefor.

This object is achieved by an air bag arrangement as well as which includes at least one electric switch a triggering process for such an air bag system. Advantageous further developments are contained in the respective dependent claims and their combinations.

Air bag systems of this type have several stages, in which case subsequent stages of the air bag system which follow a primary stage are ignited as a function of the unhindered expansion of an air bag of the air bag system. For this purpose, strings, cords or similar mechanical devices are mounted at one end in the interior of the air bag on its material and are coupled at their other end with ignition devices of at least one subsequent stage. Only when a string, cord, etc., or all strings, cords or similar devices are acted upon by tension beyond their completely tensioned state and tear, in other words, when the air bag can further expand unhindered beyond a certain point, a triggering of a subsequent stage is caused, for example, by the tearing-off of the string.

The invention therefore provides an air bag system which has multi-stage gas generating devices, with a primary stage for the partial inflating of an air bag and at least one subsequent stage which can be electrically and/or electronically triggered only as a function of an unhindered expansion of the air bag because of the inflating of a preceding stage, at least one electric switch being provided which can be switched as a function of the undisturbed, i.e., unhindered, expansion of the air bag because of the inflating of the preceding stage and is connected for the electric and/or electronic triggering of the subsequent stage.

Each switch is preferably coupled to the air bag by means of mechanical devices. As an alternative or in addition, it is preferred that each electric switch is formed by a tear element which is coupled to the air bag of mechanical devices. During the unimpaired (unhindered) expansion of the air bag because of the inflating of a preceding stage of the gas generating devices, this tear element is severed. These versions can be further developed in that the mechanical devices for coupling each switch or optionally each tear element to the air bag are formed by cables or strings of defined positions and lengths.

It is also preferred that, for each switch or optionally each tear element, when the air bag system is not triggered, a voltage is grounded, and when the air bag expands unhindered because of the inflating by a preceding stage of the gas generating devices, the switch opens or the tear element is severed, so that the grounding of the voltage is prevented. A further development consists of the fact that each switch or optionally each tear element is connected to the voltage source by means of a "pull-up" resistor or a terminal resistor. As an alternative or in addition, the voltage may amount to 12V.

The air bag system according to the invention can advantageously be further developed such that a plurality of electric switches is provided, and each switch is connected to an input of a common AND-circuit which is designed for emitting output signals for triggering the subsequent stage. In this case, the AND-circuit may be an AND-gate. As an alternative or in addition, the AND-circuit or optionally the AND-gate may respond to a voltage change of each switch and, in the case of a defined voltage change of all switches, emit an output signal for triggering the subsequent stage. The latter version can be further developed in that the defined voltage change is a voltage rise at all inputs of the AND-circuit or optionally of the AND-gate.

Another advantageous further development of the air bag system according to the invention consists of the fact that the at least one switch or optionally the AND-circuit or the AND-gate is coupled to a power device which is designed for the igniting of the subsequent stage as a function of a switching condition change of the at least one switch, of all switches or optionally of an output signal of the AND-circuit or of the AND-gate. The power device can preferably be constructed as a thyristor circuit or as a transistor circuit.

In the case of an air bag system according to the invention, a control unit may also be provided which, as a function of vehicle-occupant-specific data, blocks or activates the triggering of the subsequent stage or optionally the power device irrespective of a switching condition change of the at least one switch, of all switches or optionally of an output signal of the AND-circuit or of the AND-gate. This version can be further developed in that a diode is connected between, the at least one switch, all switches or optionally the AND-circuit or the AND-gate and the triggering of the subsequent stage or optionally of the power device. As an alternative or in addition, a diode can be connected between, the control unit and, hand, the power device. In this case, the two diodes can be connected in parallel and/or in the same direction.

Furthermore, the invention provides a triggering process for an air bag system with multi-stage gas generating devices, by a primary stage, an air bag being partially inflated and, only as a function of an unhindered expansion of the air bag, because of the inflating by a preceding stage, at least one subsequent stage being electrically and/or electronically triggered, in addition, as a function of the unhindered expansion of the air bag because of the inflating by the preceding stage, at least one electric switch being operated, and, as the result, the subsequent stage being electrically and/or electronically triggered.

A preferred further development of the process according to the invention consists of the step of an unhindered expansion because of the inflating by a preceding stage of the gas generating devices, with the switch operated by the severing of a tear element which is coupled to the air bag by mechanical devices.

As an alternative or in addition, in the case of the triggering process according to the invention for an air bag system as a function of the unhindered expansion of the air bag because of the inflating by the preceding stage, a plurality of electric switches can be operated and the subsequent stage can be triggered as a function of the operation of some or of all of the switches.

A further preferred embodiment of the process according to the invention consists of the fact that the triggering of a subsequent stage is blocked or activated as a function of vehicle-occupant-specific data irrespective of a switching condition change of the at least one switch.

In the following, the invention will be explained in detail by means of embodiments illustrated in the drawing in which additional characteristics and combinations of characteristics are disclosed.

BRIEF DESCRIPTION OF THE DRAWINGS

FIG. 1a is a view of an embodiment of an air bag system with an electric/electronic triggering control for subsequent stages;

FIG. 1b is a view of a detail of the embodiment of FIG. 1a;

DETAILED DESCRIPTION OF THE DRAWINGS

Figure 1:
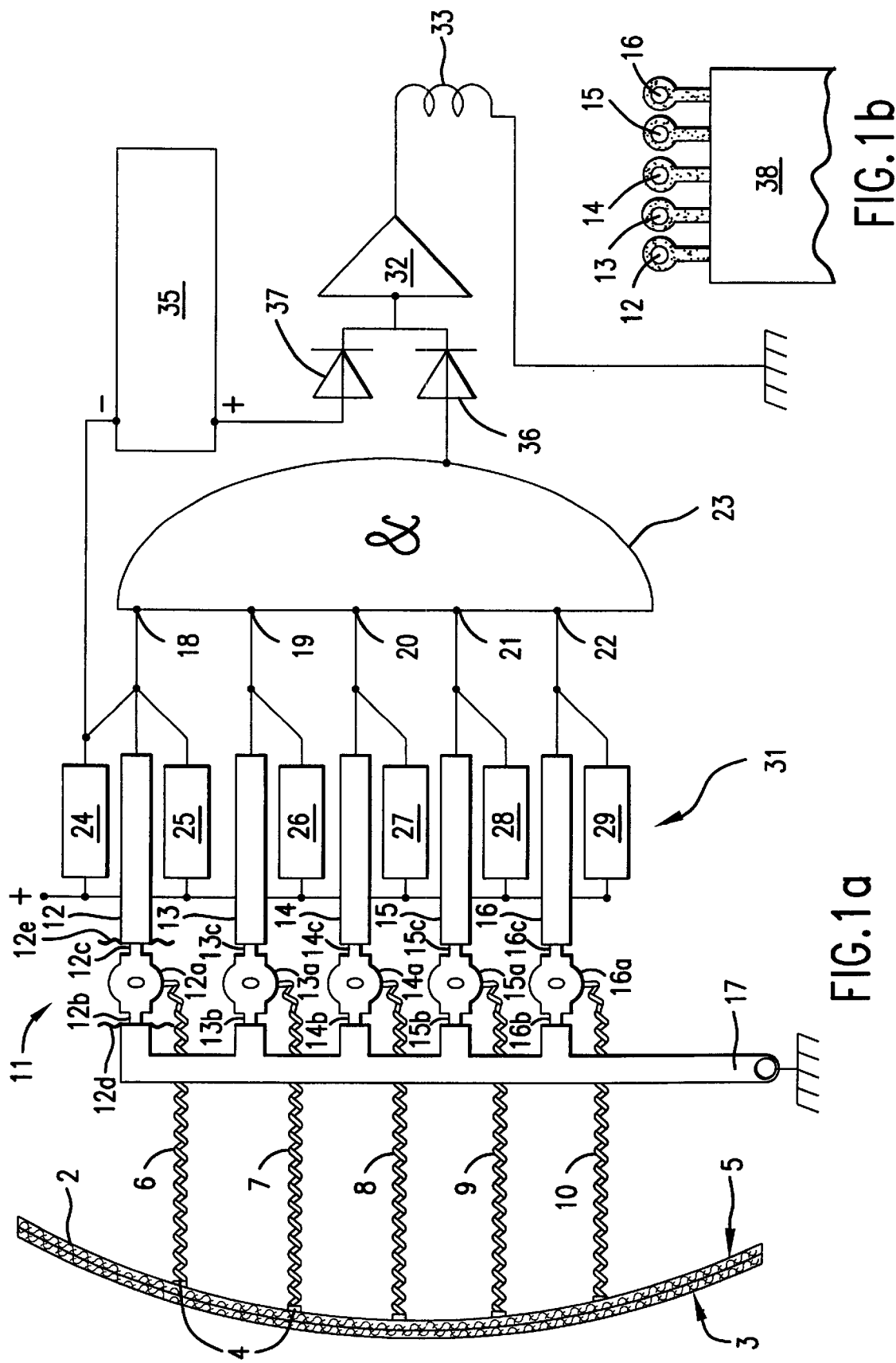

Individual reference numbers in the individual figures and illustrations of the drawings indicate identical or similar or identically or similarly acting components. The drawings also show characteristics which have no reference numbers irrespective of whether those characteristics are or are not described in the following. On the other hand, characteristics which are contained in the present description but not visible or shown in the drawing are easily understandable for a person skilled in the art.

With reference to the drawing, the following description indicates an electric/electronic circuit which ignites an electric primer cap when the air bag side facing the vehicle occupant can take up a position which can only be taken up when no occupant is out of position or unfavorably in the way.

FIG. 1a shows an embodiment of an air bag system 1 (see also FIGS. 2 and 3) with an electric/electronic triggering control for subsequent stages; and FIG. 1b shows a detail of the embodiment of FIG. 1a.

FIG. 1a is a cutout-type view of a fabric 2 of an air bag 3 of the air bag system 1 (see also FIGS. 2 and 3) which faces a vehicle occupant. At the seam points 4, mechanical devices, such as cables 6 to 10, are sewn to the interior side 5 of the fabric 2 of the air bag 3. At the ends of these cables 6 to 10, electrically conducting tear elements 12 to 16 are mounted as electric switches 11, which tear elements are, on the one side, connected in parallel to a grounding conductor 17. On the other side, the tear elements 12 to 16 are connected to inputs 18 to 22 of an AND-gate or generally to an AND-circuit 23. "Pull-up" resistors or terminal resistors 24 to 29 are in each case connected to the same inputs 18 to 22 in parallel to the gear elements 12 to 16, on the other ends of the resistors, a voltage of, for example, 12 V being applied. As long as the air bag system B has not been triggered, this applied voltage is discharged to the grounding conductor 17 by way of the "pull-up" resistors or terminal resistors 24 to 29 and the electrically conducting tear elements 12 to 16.

If, after the triggering of a first or generally preceding stage 30 (see FIG. 2 and the pertaining description), the air bag 3 of the air bag system 1 encounters no resistance by an impacting occupant during the inflating operation, which occupant is therefore not out of position for the optimal expansion and protective effect of the air bag 3 of the air bag system 1, as the result of the continued inflating of the air bag 3, all cables 6 to 10 are tensioned beyond the situation in which they pull on the tear elements 12 to 16 and finally sever the latter, so that all tear elements 12 to 16 represent opened electric switches 11. In this condition, the circuit 31 illustrated in FIG. 1a switches the AND-gate 23 to a high level. As the result, a power device 32 is controlled, whereby, in turn, an igniter 33 is ignited which triggers a second stage 34 of the air bag system 1 (see FIG. 2 and the pertaining description).

The power device 32 may be designed as a thyristor circuit or a transistor circuit. The AND-gate 23 may, in addition, be controlled externally by way of, for example, a control unit 35. In this case, two control variants are possible" "go" (+) or "no go" (−), depending on whether voltage or ground is applied.

Furthermore, for an out-of-position control, a diode may be connected between the AND-gate 23 and the power device 32 in order to implement additional operating variants. For example, in the case of a "large buckled-in man", whose vehicle-occupant-specific data can be determined by way of weight, sitting position and buckling detectors (not shown), a time delay will be undesirable during the inflating of the air bag 3 of the air bag system 1. For this type of application, the circuit permits the control unit 35 to directly control the power device 32 for triggering the second stage 34. For avoiding mutual interferences between the components, a diode 37 may be connected between the control unit 35 and the power device 32. For example, in the case of a "small woman", whose vehicle-occupant-specific data can also be determined by means of weight, sitting position and buckling detectors (not shown), an undesirable ignition of a second, particularly strong, stage 34 of the air bag system 1 can be avoided. In the present embodiment, this is implemented in that, by way of the control unit 35, "minus" is switched to the inputs of the AND-gate 23 and the ignition of the second stage 34 (see FIG. 2) is therefore always prevented, irrespective of whether the cables 6 to 10 are severing the tear elements 12 to 16 or have severed them.

Tear elements 12 to 16 can be produced in a simple manner, for example, as a correspondingly punched grid of a plastic plate provided with a conductive material. The tear elements 12–16 have a circular cutout portion 12a–16a for attachment of cables 6–10, and reduced, weakened portions 12b and 12c (to 16b–16c) connecting on either side the circular cutout portions 12a–16a to the main part of the plate 12–16. By way of example for all tear elements, the severing of the tear element 12 is indicated in FIG. 1 by wavy lines 12d and 12e. Coated foils, which can be rolled in a worm-type or worm-shaped manner, can also be used for the accommodation with the air bag.

FIG. 1b illustrates a portion of a gas generator or generally of gas generating devices 38 of an air bag system 1. In the illustrated section, the circuit of FIG. 1a is accommodated, for example, as a chip 39 (see FIG. 2) and the tear elements 12 to 16 project out of the gas generator 38 for connecting the cables 6 to 10. For a protection against defective electronic devices, the circuit can also be designed in a double parallel manner, since the costs amount only to pennies. As an alternative, HAL- or Hall-generators can also be used as signal generators, as the result of which small magnets are torn off which are fastened on the tear cables (not shown).

Figure 2:
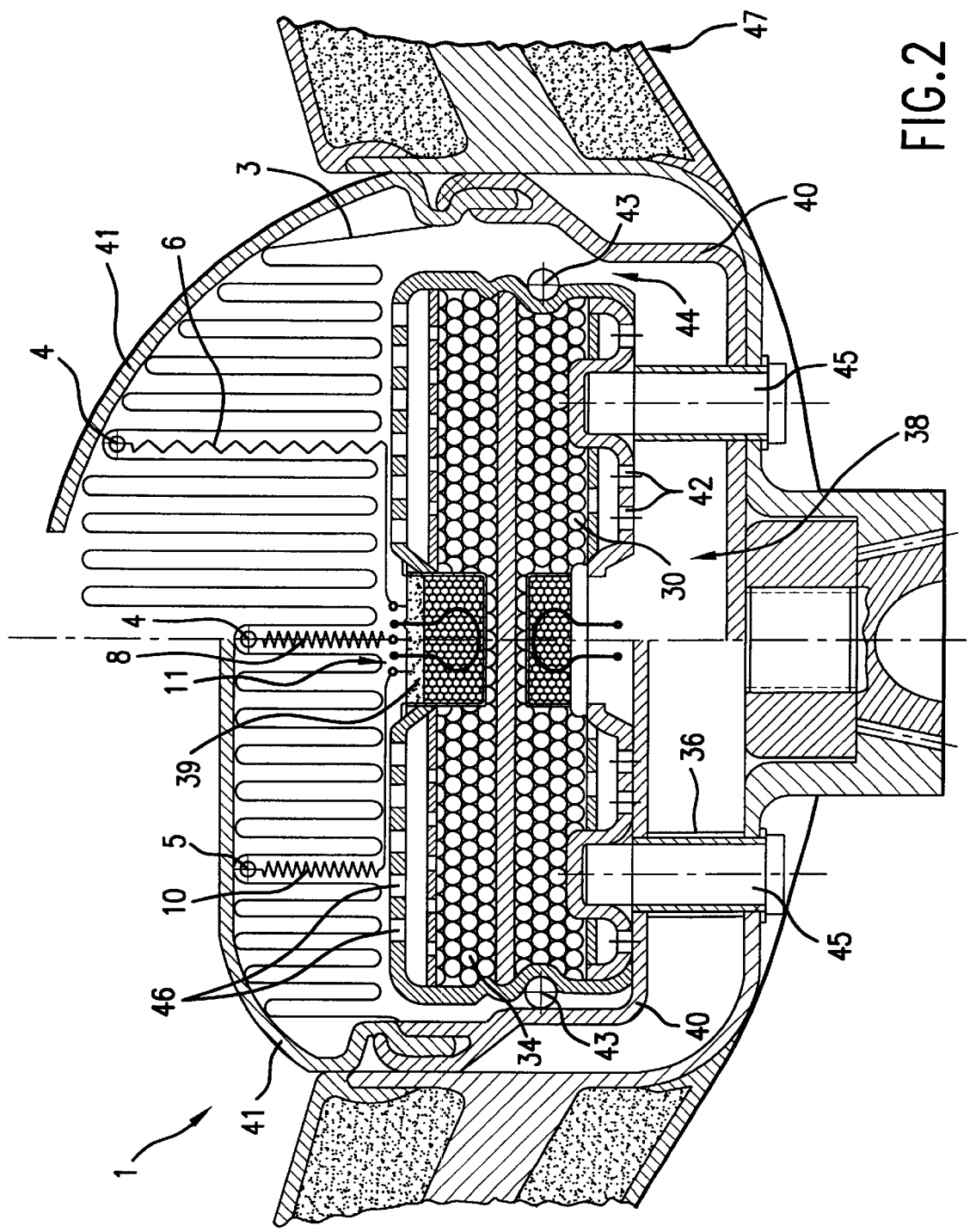
FIG. 2 is a view of an embodiment of an air bag system with an electric/electronic triggering control for subsequent stages according to FIGS. 1a and 1b.

On the example of a driver-side air bag, FIG. 2 shows the construction of a two-stage air bag generator or gas generator 38 whose first stage 30 severs by means of a pressure trough 40 a predamaged or preweakened air bag flap 41 and pulls it away from the vehicle occupant, as described in Patent Application 197 33 896.8 for the front passenger side, whose disclosure content is fully included here by reference in order to avoid a simple repetition and as far as it is required or helpful for understanding the present invention. On the left in FIG. 2, the air bag system 1 is illustrated before a triggering. On the right in FIG. 2, the air bag system 1 is illustrated after a triggering of only the primary stage.

The ignition of the first stage or primary stage 30 takes place, for example, in a conventional manner electrically by a control (not shown) which is triggered by way of impact sensors (not shown). Blow-out holes 42 of the first stage 30 are directed only into the pressure trough 40. For building up pressure, the pressure trough 40 is sealed off by means of a surrounding seal 43 with respect to the generator 38. For example, by means of a corresponding design toward the air bag 3, the pressure trough 40 opens up a ring gap 44 which is coordinated such that the pulling-open of the air bag flap 41 and the inflating of the first pressure stage of the air bag 3 take place so that they blend into one another with respect to time. The positioning of the generator 38 by means of, for example, bolts 45, on a type of "stilt" is advantageous in order to provide the desired movement possibility for the pressure trough 40.

The ignition of a second stage or generally of a subsequent stage 34 of the gas generator 38 was described in detail in connection with FIG. 1a. In this case, the gas outlet 46 of the second stage 34 is, for example, aimed directly in the direction of the interior of the air bag 3.

Many other constructive details are contained in the illustration of FIG. 2, including, for example, a position securing of the pressure trough 40 by means of plastic sleeves 36 (left side of FIG. 2) which are designed such that they break when the pressure trough 40 is moved. This air bag system is installed into a steering wheel 47.

Figure 3:
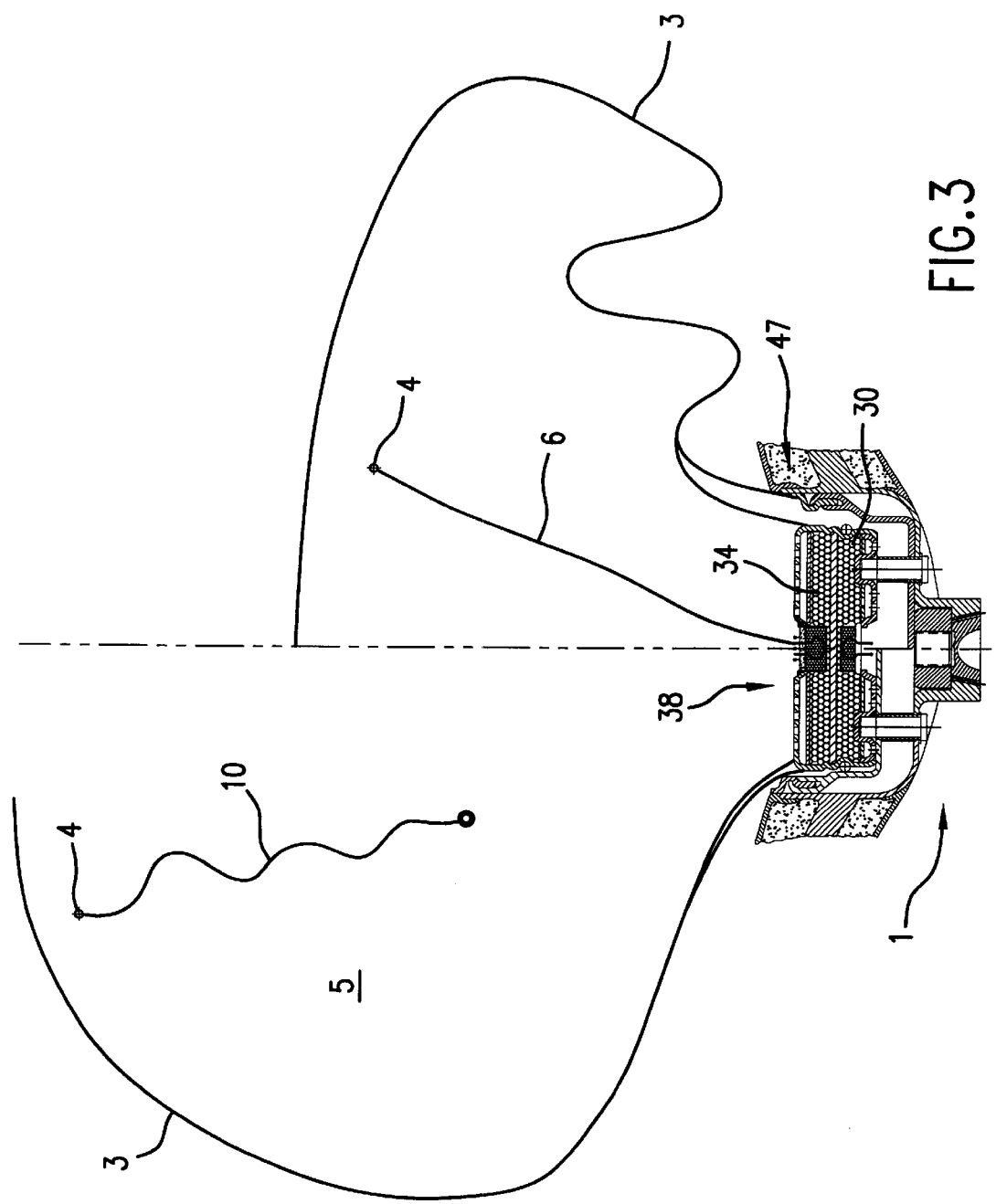
FIG. 3 is a view of the effect of the control of the air bag system according to FIG. 2 during the inflating of the air bag.

FIG. 3 shows the effect of the control of the air bag system 1 according to the invention (for example, according to FIG. 1a) during the inflating of the air bag 3. On the right side of FIG. 3, the air bag system 1 is shown when only the primary stage 30 is triggered; on the left side of FIG. 3, the air bag system 1 is shown while, in addition, the second or secondary stage 34 is triggered.

An air bag system having the ignition switching of the second stage or generally of subsequent stages according to the invention has the following advantages:
1. A fast switching is possible;
2. the costs are low;
3. it an be integrated into the ignition cartridge;
4. the opening of the air bag cover and the charge of the first stage can be coordinated;
5. the first stage is designed as a "soft air bag" and a detection or sensing stage for a possible "out-of-position" location of the vehicle occupant; and
6. the second stage is ignited only if no "out-of-position" location was detected or sensed by the first stage.

The invention is not limited to the characteristics or combinations of characteristics of the above-described embodiment illustrated in the drawing. The individual aspects, characteristics and combinations of characteristics of the present invention can be implemented and deserve protection alone as well as combined. In addition to the general and concrete information contained in the present documents for the implementation of a safety system according to the invention, the scope of the invention also includes all variations, modifications, substitutions and combinations which a person skilled in the art can easily recognize in the documents themselves and/or while using his technical knowledge.

What is claimed is:

1. Air bag system comprising an air bag, multi-stage gas generating devices for inflating the air bag to a primary stage wherein the air bag is partially inflated to a predetermined state, and to at least one subsequent stage wherein the air bag is further inflated, at least one electric switch, at least one mechanical device coupling said at least one electric switch to the air bag for causing said at least one electric switch to be switched, responsive to unhindered expansion of the air bag to said predetermined state of partial inflation, to trigger the gas generating device for the at least one subsequent stage to produce said further inflation of the air bag and wherein a voltage source is applied to the at least one electric switch, one side of which is connected to ground, and wherein when the air bag has inflated to the predetermined state of partial inflation, the connection to ground is broken.

2. An air bag system according to claim 1 wherein said at least one electric switch is formed in part as a tear element which is coupled by the said one at least mechanical device to the air bag and is severed when the air bag is inflated to the predetermined state of partial inflation.

3. An air bag system according to claim 2 wherein a plurality of switches with associated tear elements are provided, each coupled by a respective mechanical device to the air bag.

4. An air bag system according to claim 1 wherein the at least one mechanical device is formed in part by an elongated element.

5. An air bag system according to claim 1 wherein the at least one electric switch is formed as a tear element which is severed responsive to the air bag being inflated to said predetermined state of partial inflation.

6. An air bag system according to claim 1 wherein the at least one electric switch is connected to the voltage source by a resistor.

7. An air bag system according to claim 1 wherein the voltage source is 12 V.

8. An air bag system comprising an air bag, multi-stage gas generating devices for inflating the air bag to a primary stage wherein the air bag is partially inflated to a predetermined state, and to at least one subsequent stage wherein the air bag is further inflated, at least one electric switch, at least one mechanical device coupling said at least one electric switch to the air bag for causing said at least one electric switch to be switched, responsive to unhindered expansion of the air bag to said predetermined state of partial inflation, to trigger the gas generating device for the at least one subsequent stage to produce said further inflation of the air bag and wherein a plurality of electric switches are provided with each switch connected as an input to a common AND-circuit, the output of which triggers the subsequent stage.

9. An air bag system according to claim 8 wherein the AND-circuit is an AND-gate.

10. An air bag system according to claim 8 wherein the AND-circuit is responsive to a voltage change of each switch.

11. An air bag system according to claim 10 wherein the voltage change is a voltage rise on the input of the AND-circuit.

12. An air bag system according to claim 10 wherein the AND-circuit is coupled to a power device designed for igniting the subsequent stage responsive to an output of the AND-circuit.

13. An air bag system comprising an air bag, multi-stage gas generating devices for inflating the air bag to a primary stage wherein the air bag is partially inflated to a predetermined state, and to at least one subsequent stage wherein the air bag is further inflated, at least one electric switch, at least one mechanical device coupling said at least one electric switch to the air bag for causing said at least one electric switch to be switched, responsive to unhindered expansion of the air bag to said predetermined state of partial inflation, to trigger the gas generating device for the at least one subsequent stage to produce said further inflation of the air bag and wherein the at least one electric switch is coupled to a power device designed for igniting the subsequent stage responsive to a switching condition change of the at least one switch.

14. An air bag system according to claim 13 wherein the power device includes one of a thyristor circuit and transistor circuit.

15. An air bag system according to claim 13 wherein a diode is connected between, the at least one electric switch and the power device.

16. An air bag system comprising an air bag, multi-stage gas generating devices for inflating the air bag to a primary stage wherein the air bag is partially inflated to a predetermined state, and to at least one subsequent stage wherein the air bag is further inflated, at least one electric switch, at least one mechanical device coupling said at least one electric switch to the air bag for causing said at least one electric switch to be switched, responsive to unhindered expansion of the air bag to said predetermined state of partial inflation, to trigger the gas generating device for the at least one subsequent stage to produce said further inflation of the air bag and further including a control unit which controls the triggering of the subsequent stage as a function of vehicle-occupant-specific data irrespective of a switching condition change of the at least one electric switch.

17. An air bag system according to claim 16 wherein a diode is connected between the control unit and a power device designed for igniting the subsequent stage.

18. An air bag system according to claim 17 wherein a second diode is connected between the at least electric switch and the power device, and the two diodes are connected in parallel.

19. An air bag system according to claim 18 wherein the two diodes are connected in the same direction.

20. Triggering process for an air bag system having multi-stage gas generating devices and defining a primary stage in which an air bag is partially inflated to a predetermined state of inflation as a result of unhindered expansion, and a subsequent stage in which the air bag has undergone further inflation, comprising the steps of, inflating the air bag to the predetermined state of inflation, changing the operating condition of at least one electric switch that is coupled to the air bag by a mechanical device, responsive to the air bag being inflated and experiencing unhindered expansion to the predetermined state of inflation, and triggering the subsequent stage to produce further inflation of the air bag responsive to the change of the operating condition of the at least one electric switch and blocking or activating triggering of a subsequent stage as a function of vehicle-occupant-specific data, irrespective of the operating condition of the at least one electric switch.

21. Triggering process for an air bag system according to claim 20 including the further step of effecting the changed operating condition of the at least one electric switch by severing a tear element incorporated as part of the at least one electric switch, which tear element is coupled to the air bag by the mechanical device.

22. Triggering process for an air bag system according to claim 20 wherein the operating condition of a plurality of switches is changed, and responsive thereto the subsequent stage is triggered.

* * * * *